Aug. 5, 1947.  W. A. RAY  2,425,124
AUTOMATIC COUNTER SYSTEM
Filed July 25, 1942  2 Sheets-Sheet 1

INVENTOR
William A. Ray
BY John Flam
ATTORNEY

Patented Aug. 5, 1947

2,425,124

UNITED STATES PATENT OFFICE 2,425,124

AUTOMATIC COUNTER SYSTEM

William A. Ray, Glendale, Calif., assignor to General Controls Co., a corporation Application July 25, 1942, Serial No. 452,353

11 Claims. (Cl. 235—92)

This invention relates to a system for determining the number of cycles of operations of a machine tool or the like; and thereby rendering it possible to determine the number of pieces that have been finished or operated upon by the tool.

For example, automatic or semi-automatic turret lathes or screw machines are usually arranged so that the stock is automatically fed to the machine. Such stock, in the form of a bar, rod or tube, is periodically advanced through a rotary chuck. When the stock is completely used up, it is necessary manually to replenish the stock.

It is one of the objects of this invention to provide a reliable and simple supervisory system for such machine tools, making it possible to not only determine the number of completed pieces, but to signal that the stock is exhausted and that the machine needs a fresh supply.

In order to accomplish these results, use is made of an electrical system, so arranged as to respond to the establishment of electrical contact between the stock and a measuring stop that is used to determine the length of stock for each piece. Every time a length of stock is thus measured, an appropriate control circuit responds and a counter mechanism is actuated. It is another object of this invention to ensure reliable operation of a system utilizing this measuring step. More especially, it is an object to obviate the possibility of a false count that would otherwise occur in the event that there is a chattering of the stock while it is urged against the measuring stop.

It is still another object of this invention to provide time delay mechanism so arranged that it will respond to a signal that the stock is used up, only in the event that the counter mechanism has been inactive for a period considerably exceeding that required to complete all of the operations to be performed on one piece by the machine.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings.

Figure 1:
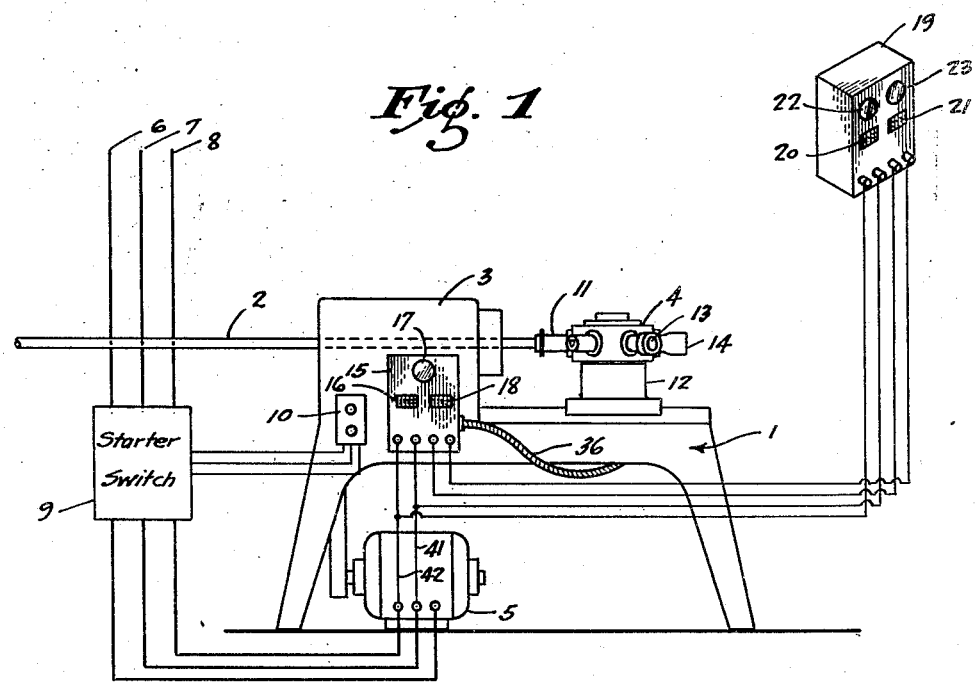
Figure 1 is a diagrammatic representation of a machine tool equipped with a system utilizing the invention.

In the present instance there is shown a turret lathe 1 (Fig. 1), which may be automatic or semi-automatic. It operates upon stock 2 which may be of bar form, passing through the head 3 of the lathe 1. The lathe 1 is equipped with an angularly adjustable turret 4, shown in greater detail in Fig. 2, and carrying a number of tools capable of being placed, in succession, into operative relationship with respect to the stock 2.

The source of motion for the lathe 1 is supplied in this instance by the aid of an electric motor 5. This electric motor is shown as a multiphase motor connected to the mains 6, 7 and 8 by the aid of a starter switch 9. A push button control 10 may be provided for starting and stopping the motor 5.

The first step in the cycle of operations on the stock 2 to form a finished piece is to urge the stock 2 against a measuring stop 11 carried by the turret 4. As shown most clearly in Fig. 2, this turret 4 is shown as rotatable about a vertical axis in a guide 12, that is capable of being adjusted along the bed of the lathe 1. The turret 4 has appropriate provisions for supporting a number of other tools, such as 13 and 14 (Fig. 1) adapted to operate in succession from the stock 2, by appropriate angular adjustment of the turret 4.

By appropriate adjustment of stop 11 the length of stock protruding from the head 3 of the lathe 1 is determined. Thereafter the other tools such as 13, 14 carried by the turret 4 operate to perform machine operations upon the stock and finally to sever the finished piece from the bar of the stock 2.

Since the stock 2 is metallic, it is possible to use it to establish an electrical ground connection to the stop 11. In this way during at least a portion of any cycle of operations performed by the turret 4, the stock 2 is in electrical contact with the stop 11. The temporary electrical contact between the stock 2 and the stop 11 is utilized to control a counter system, to determine the number of completed pieces; and if desired, to signal when the stock 2 is exhausted.

The counting of the pieces operated upon by the turret lathe 1, as well as indicating when the stock 2 is exhausted can be accomplished both at the turret lathe 1 and at a remote point, such as a production office, as by utilizaiton of parallel indicating circuits. Thus in Fig. 1 for example there is an indicator board 15 supported adjacent lathe 1. This board has a register or counter 16, a light 17 intended to be lit when the stock 2 is exhausted, as well as an elapsed time measurer 18. A similar setup is indicated by the indicator board 19 adapted to be placed in a production office with similar installations for other machines. This board 19 includes the counter mechanism 20 placed in parallel with the counter mechanism 16, as well as an elapsed time measurer 21 placed in parallel with the elapsed time measurer 18. The lamp 22 is placed in parallel with the lamp 17, to indicate when lit that the stock 2 is exhausted. If desired, an additional lamp 23 may be energized in parallel with the elapsed time meter 21. The elapsed time meters 18 and 21 measure the time during which the turret lathe 1 is supplied with power from the mains 6, 7 and 8.

Figure 3:
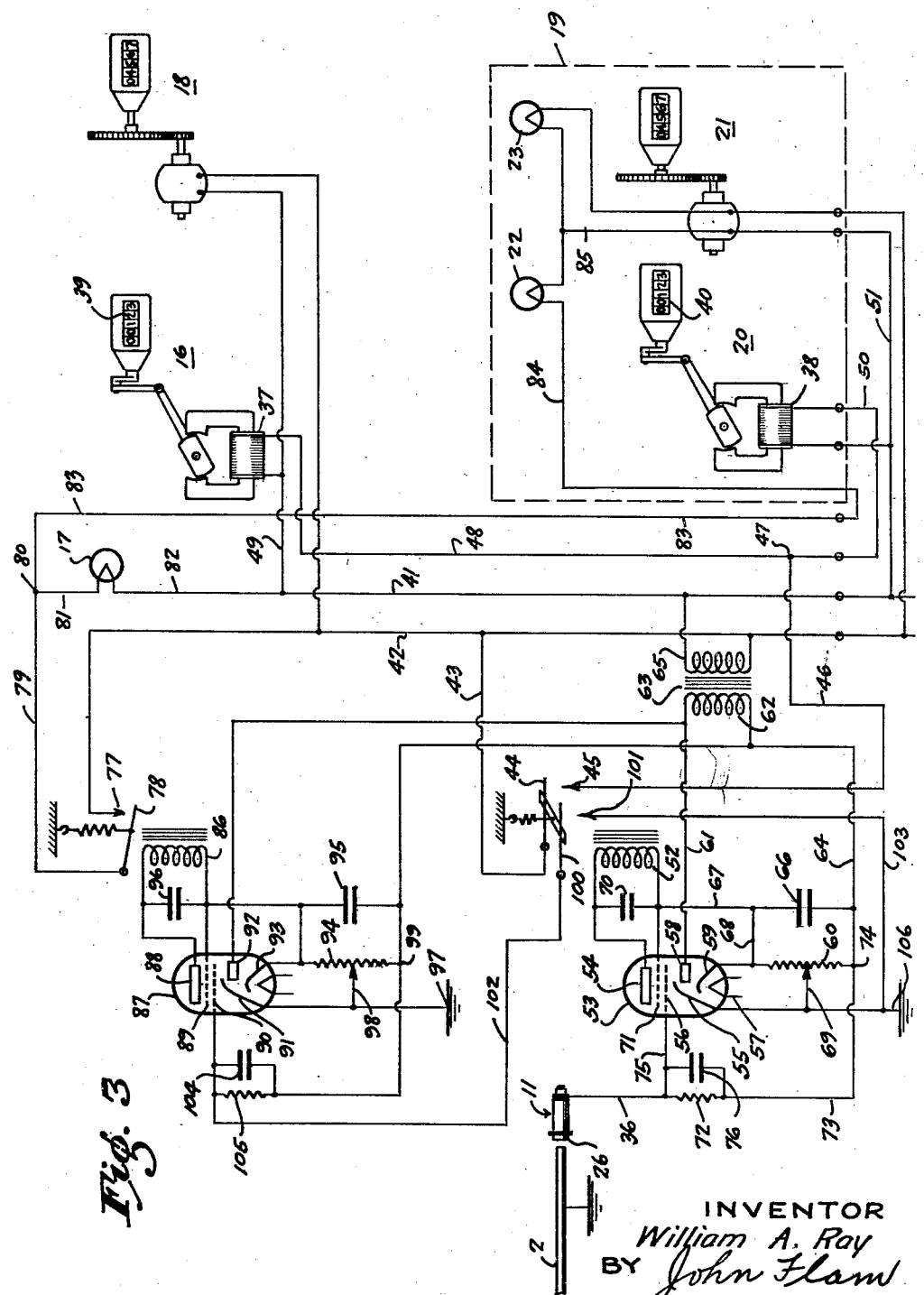
Fig. 3 is a wiring diagram of the system incorporating the invention.

The counter mechanisms 16 and 20, the elapsed time meters 18 and 21, and the lamps 17, 22 and 23 are indicated in diagrammatic fashion in Fig. 3. This figure also shows the circuits that are utilized for operation of these various signaling or indicating devices.

Figure 2:
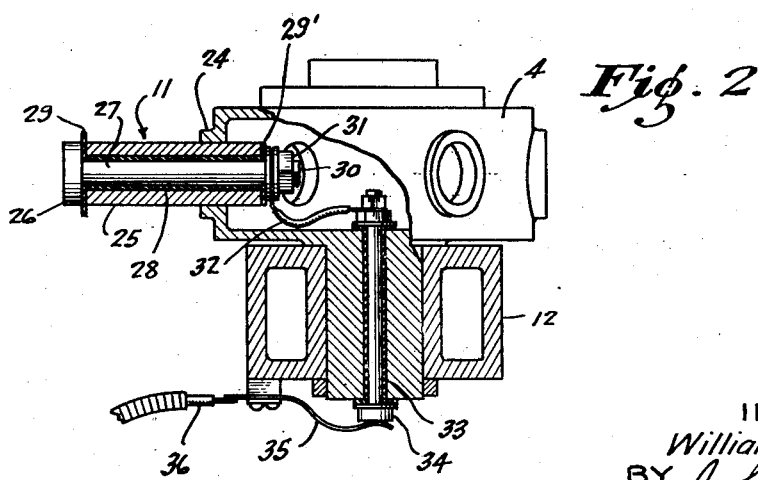
Fig. 2 is a view, mainly in vertical section, of the turret portion of the machine tool illustrated in Fig. 1.

The cyclic grounding of a circuit by contact of the stock 2 with the stop 11 is made possible by insulating that portion of stop 11 from ground which is intended to be contacted by the stock 2. This stock 2 being in intimate metallic contact with the turret lathe 1, is grounded at all times; and the stop 11 would also be permanently grounded unless special provisions were made. Such special provisions are indicated in Fig. 2.

Thus in this instance the outer sleeve 25 of stop 11 is shown as projecting from an apertured support 24 carried by the turret 4. The head 26 and the shank 27 are insulated from the sleeve 25, as by the aid of the insulation sleeve 28, and the insulation washers 29 and 29'. The insulation washer 29 disposed behind the head 26 is made considerably larger in diameter than the head 26. In this way when lubricating or cooling liquid is poured over the left hand end of the stock 2, the danger of grounding the head 26 on the outer sleeve 25 through the liquid is considerably lessened.

The shank 27 is provided with a threaded extremity 30, by the aid of which the stop structure may be maintained in assembled condition, as by the nut 31. To provide an electrical connection to the shank 27, use is made of a lead 32 connected to a binding post structure 33. This binding post structure is shown in the present instance as having an axis coinciding with the axis of rotation of the turret 4. The binding post structure is appropriately insulated from the turret 4 and carries a contact head 34 at its lower end. This contact head 34 is adapted to be in constant electrical connection with a flat spring 35 insulatingly supported upon the guide 12. An electrical connection 36 extends from the spring 35 to other parts of the system.

The electrical system whereby the counters and other indicators or signaling devices are actuated is shown to best advantage in Fig. 3. In this figure the counters 16 and 20, respectively adjacent the lathe 1 and in a production office, are shown as including the electromagnetic coils 37 and 38 respectively. Periodic energization of the coils 37 and 38 cause corresponding advancement of the register 39 or 40 respectively. This may be accomplished for example by the rotary magnetic armature structure diagrammatically illustrated; but other means can obviously be utilized for this function.

Both of these counter mechanisms 16 and 20 are arranged to be energized in parallel from mains 41 and 42. These mains 41 and 42 lead to one of the phases of the supply mains 6, 7 and 8 illustrated in Fig. 1.

The energizing circuits for the counter mechanisms 16 and 20 may be traced as follows: From main 42, connection 43, movable contact arm 44, stationary contact point 45, connection 46 to a junction 47. At junction point 47 connection 48 proceeds to the coil 37. The other side of the coil 37 is connected by a lead 49 to the other main 41. Also proceeding from junction point 47 is a connection 50 leading to the coil 38. The other side of the coil 38 is connected by lead 51 to the main 41.

Energization of the counter mechanisms 16 and 20 thus depends upon the establishment of this circuit through the contact arm 44 and the contact point 45.

Arm 44 and point 45 are elements of an electromagnetically energized relay, including the actuating coil 52. This actuating coil 52 is arranged to be energized whenever stock 2 makes electrical contact with the head 26. In order to accomplish this result, use is made of an electronic emission device 53. The output circuit of this electronic emission device includes the coil 52. The device also includes, as is usual, an anode 54 and a cathode 55, as well as a control electrode or grid 56. A heater 57 is utilized in this instance for the cathode 55. As is well understood, the potential difference between cathode 55 and control electrode 56 determines the value of the space current between cathode 55 and anode 54.

A suitable source of direct current for impressing an appropriate positive potential upon the anode 54 with respect to the cathode 55 (as required for electronic emission devices), is provided. For this purpose, the electronic emission device 53 incorporates a pair of rectifier electrodes. Thus there is an anode 58 and a cathode 59. The cathode 59 may appropriately be heated by the heater 57. The anode 58 and cathode 59 form a half wave rectifier for supplying a rectified electromotive force across the terminals of a potentiometer resistance 60. The circuit for the potentiometer resistance 60 thus includes the anode 58, connection 61, secondary coil 62 of a transformer 63, connection 64, resistance 60 and cathode 59. The primary coil 65 of transformer 63 is shown as directly connected across the alternating current mains 41 and 42. In order to reduce the fluctuations in the direct current flow, use may also be made of a by-pass condenser 66 paralleling resistance 60. In a usual installation the resistance 60 may be of the order of 10,000 ohms and capable of carrying 10 watts. Condenser 66 may be of the order of 4 microfarads. The transformer 63 may be so designed that the potential difference across the resistance 60 is about 115 volts.

The output circuit for the electronic emission device 53 includes the relay coil 52, connections 67 and 68, upper or positive terminal of resistance 60, variable tap 69, and the grounded cathode 55. By appropriate adjustment of the variable tap 69, the potential difference between anode 54 and cathode 55 may be adjusted. In the present instance the maximum potential difference across the terminals of resistance 60 is of the order of 115 volts. The coil 52 may be provided with a by-pass condenser 70 adapted to carry the alternating current component of the output circuit. This condenser 70 may also be of the order of 4 microfarads. If desired, a screen grid 71 may be provided in the electronic emission device 53, connected to the positive terminal of the potentiometer resistance 60.

In the normal operating condition of the circuits, while stock 2 is out of contact with the head 29, the control electrode 56 is maintained at a potential such that the output current is insufficient effectively to energize the relay mechanism including the coil 52. Thus the potential of the control electrode 56 is negative with respect to the cathode 55. This is apparent because the control electrode 56 is connected through a resistance 72 and connection 73 to the negative terminal 74 of the potentiometer 60. Since the tap 69 which is in direct connection with the cathode 55 is at a potential somewhat higher than the negative terminal 74, the control electrode 56 is thus negative with respect to the cathode 55 by the potential difference between tap 69 and point 74. A suitable potential difference to reduce the output current to an ineffective value is about 25 volts.

The characteristics of the electronic emission device 53 are such that when the control electrode 56 is at the same potential as that of the cathode 55, then an operative current can flow through the coil 52. Since the cathode 55 is grounded at ground 106, it is thus merely necessary, in order to energize relay coil 52, to ground the control electrode 56. Such a grounding is accomplished by contact of the stock 2 with the head 29 through connections 36 and 75. Accordingly when the stock 2 touches the head 29, the relay coil 52 is energized.

As heretofore explained, the energization of the coil 52 causes contact to be established between arm 44 and point 45, thereby causing energization of the counter mechanism coils 37 and 38.

The grounding of grid 56 occurs only while the stop 11 is in contact with stock 2. As soon as the turret 4 rotates to bring another tool into position to operate upon the stock 2, the stop 11 is moved out of contact with the stock 2; and the potential of control electrode 56 is now no longer determined by the grounded stock 2.

While head 26 cooperates with stock 2, some slight chatter between these parts often occurs. Due to this chatter, there may be a repeated making and breaking of contact between the stock 2 and the head 26. Such repeated making and breaking of the contact would result in a false count by the counter mechanisms 16 and 20.

In order to prevent such false indications, provisions are made to ensure that the potential of control electrode 56 with respect to the cathode 55 is maintained at operative value for a limited period, even after the stock 2 is moved out of contact with the head 29. Thus after a contact is broken between the stock 2 and head 26, a time delay of the order of thirty seconds is provided during which the control electrode 56 stays at an operative potential with respect to the cathode 55. This time delay period is made considerably less than the period required to complete one cycle of operations of the turret lathe 1. In this way it is ensured that before a piece is completely finished or a cycle entirely completed, the relay coil 52 will be deenergized, and the counter mechanisms 16 and 20 will be returned to the inactive position ready for another actuation.

The time delay is obtained in this instance by the aid of a condenser 76 placed in parallel with the resistor 72. The resistor 72 can be of the order of 50,000 ohms and the condenser 76 can be of the order of 4 microfarads. In the condition of the system illustrated in Fig. 3, the condenser 76 may be assumed to have been completely discharged through the resistance 72. Accordingly as heretofore stated, at this stage of operation the control electrode 56 is at a potential that is 25 volts negative with respect to the cathode 55.

As soon as the control electrode 56 is grounded through the stock 2, a potential difference is impressed upon the condenser 76 corresponding to the potential difference between tap 69 and point 74. This charging circuit can be traced as follows: From a ground 106, tap 69, part of potentiometer resistance 60, point 74, connection 73, condenser 76, stop 11, and grounded stock 2. The condenser 76 is sufficiently large to be fully charged in a very short period after this contact is established. The upper plate of condenser 76, being in direct contact with eelctrode 56, is also at ground potential. Its lower plate is at a potential 25 volts below ground potential.

Now if the contact is broken between stock 2 and head 29, the condenser 76 can discharge through the high resistance 72. This rate of discharge is made sufficiently low so that for a period of about thirty seconds, the potential of control electrode 56 is maintained near the same potential as the upper plate of condenser 76; that is, at about ground potential. Accordingly during this time delay period, relay coil 52 remains energized even during minor periods of chatter. It is only when the stop 11 is moved out of the way of stock 2 that the condenser 76 finally discharges through the resistance 72, and its upper plate reaches to a negative potential corresponding to the negative terminal 74 of resistance 60. The potential of control electrode 56 is likewise reduced to this negative value.

The elapsed time meters 18 and 21 may be driven in any appropriate manner so as to be active while the switch 9 (Fig. 1) is closed. For this purpose these meters may simply be connected across mains 41 and 42. The pilot lamp 23 is in parallel with the elapsed time meter 21. While this light is on in the production office, the observer knows that the lathe 1 is in operation. He can determine the elapsed time of activity of the lathe 1; he can also read the register 20 to determine how many pieces have been completed. If the pilot lights 17 and 22 are dark, he knows that stock 2 is not exhausted. If lights 17 and 22 are illuminated, however, he knows that the stock 2 is exhausted and he may take appropriate steps to replenish the supply.

The pilot lights 17 and 22 are arranged to be energized by the aid of a circuit connected across the mains 41 and 42. The circuit for the pilot lights 17 and 22 can be traced as follows: From main 42 to a relay contact point 77, relay contact arm 78, connection 79, and junction point 80. From junction point 80, parallel circuits extend through lamps 17 and 22. The circuit for lamp 17 includes lead 81, lamp 17 and lead 82 to the main 41. The circuit for lamp 22 includes leads 83 and 84, lamp 22, and leads 85 and 51 to the main 41.

The relay contacts 77 and 78 are controlled by a relay coil 86. Normally this relay coil is deenergized so that the pilot lights 17 and 22, warning of the necessity of replenishing of the stock, are energized.

Relay coil 86 is connected into the output circuit of an electronic emission device 87. This electronic emission device has anode 88, screen grid 89, a control electrode 90 and cathode 91 serving identical functions as the corresponding electrodes in the electronic emission device 53. The electronic emission device 87 may also be provided with the rectifying electrodes comprising the anode 92 and cathode 93. These electrodes, together with the potentiometer resistance 94 are connected in the same manner as the corresponding elements associated with the electronic emission device 53. As before, a condenser 95 may be connected in parallel to the potentiometer resistance 94. This potentiometer resistance is connected in series with the secondary coil 62 of the transformer 63, through the space current between electrodes 93 and 92.

A by-pass condenser 96 can be connected in parallel across the relay coil 86. The cathode 91 is shown as connected to ground 97. This ground 97 is connected by the aid of the tap 98 to a point on the potentiometer resistance 94, which corresponds to a positive value of about 25 volts with respect to the negative terminal 99 of the potentiometer resistance.

As before, if control electrode 90 is not grounded, then this control electrode has a potential which is negative with respect to the cathode 91. The negative potential corresponds to the difference in potential between tap 98 and point 99. However, if the control electrode 90 is grounded, then its potential is the same as that of cathode 91, and an operating output current can flow through the relay coil 86 to maintain the arm 78 in the open position indicated.

Grounding of the control electrode 90 is accomplished by the aid of the relay arm 100 and relay contact 101 associated with the relay coil 52. Thus when the coil 52 is energized it not only causes arm 44 to contact 45, but arm 100 is also placed in electrical contact with point 101. This completes a grounding circuit for the control electrode 90 through connection 102, contacts 100 and 101 and connection 103 to the ground 106.

Accordingly, upon energization of relay 52, the relay coil 86 is likewise energized. However, this energization persists for a time delay interval even after the contact between arm 100 and contact 101 is broken; and such a condition is illustrated in Fig. 3.

This time delay, as before, is obtained by the aid of a condenser 104 and a high resistance 105 paralleling the condenser 104. One side of this parallel circuit is connected to the negative terminal 99 of the potentiometer 94. The other terminal is connected to the control electrode 90.

In this instance the time delay is substantially greater than that required to complete one cycle of operations by the turret lathe 1. Accordingly the resistance 105 is considerably higher than the resistance 72. In fact, it may be as high as 5 megohms, to provide a delay of about two minutes before the relay 86—77—78 drops out.

The mode of operation of this time delay circuit is identical with that explained in connection with the electronic emission device 71. During normal operation there is a succession of contacts between the stock 2 and stop 11, as the turret 4 is angularly moved. Corresponding with these succession of contacts, there is a succession of periods of energization of relay coil 52, as hereinbefore explained. The interval between successive energizations of coil 52 is so short that relay coil 86 associated with electronic emission device 87 does not drop out.

However, if the stock 2 is exhausted, the relay 52 remains permanently deenergized. After about two minutes (or any other suitable interval), the relay coil 86 is deenergized and contact is made between point 77 and arm 78. This contact causes energization of the signal lamps 17 and 22. The operator at the machine is warned, as well as the observer in the production office. The signal lamps 22 and 23 at the production office may be of distinguishing color, so that there is no confusion in the meaning of the signal.

A summary of the mode of operation of the system may now be set forth. As the stock 2 is fed intermittently or in a step by step manner through the head 3 of the lathe 1, it intermittently contacts the head 29 of stop 11. This contact causes the potential of control electrode 56 of electronic emission device 53 to attain a value such that relay coil 52 is energized. It remains energized for a period of about thirty seconds, after stop 11 moves out of the way of stock 2.

Energization of relay coil 52 accomplishes two purposes. The first immediate function is the closing of the contact between elements 44 and 45, causing energizing of the counter mechanism coils 37 and 38. This causes the counter registers 39 and 40 to be advanced. As soon as relay coil 52 is deenergized, the counter mechanism coils 37 and 38 return to the deenergized position illustrated.

The other function of the energization of the coil 52, is the making of contact between elements 100 and 101. This contact connects the control electrode 90 of electronic emission device 87 to ground, so that the relay coil 86 is energized. Furthermore, even after the contact between elements 100 and 101 is broken for as long as about two minutes, the relay coil 86 remains energized. This energization of the relay coil 86 maintains the arm 78 out of contact with point 77. Accordingly, the signal lamps 17 and 22 are deenergized. If relay coil 52 should remain deenergized for a period of longer than two mintues, relay coil 86 will become deenergized, and contact would be established between point 77 and arm 78. This would cause energization of the signal lamps 17 and 22, indicating failure of the stock 2 in the machine.

What is claimed is:

1. In a registering system for machines adapted to operate through repeated cycles on metallic stock, a register, an electric circuit for operating the register, and a metallic member with which the stock contacts during one portion only of the cycle of operation of the machine on the stock, for controlling said circuit, said circuit including means that introduces a time delay to maintain the circuit in active controlling condition for a limited time, and operative in response to removal of the stock from the metallic member, said time delay being substantially less than the interval required to perform a complete cycle of operations on the stock.

2. In a registering system for turret type machines having one or more tools carried by the turret, for operating through repeated cycles on metallic stock, means carried by the turret for forming a stop for the stock at the beginning of a cycle of machine operations, and a registering electric circuit controlled by contact between the stock and the stop, said circuit including means that introduces a time delay to maintain the circuit in active controlling condition for a limited time in response to removal of the stock from the stop, said time delay being substantially less than the interval required to perform a complete cycle of operations on the stock.

3. In an indicating system for machines operating on stock fed to the machine in successive increments, an indicating circuit, a member cooperating with the stock for a limited portion of each complete cycle of operations from the feeding of one increment to the feeding of a successive increment, and means associated with the member for rendering said indicating circuit inactive while said stock is in co-operative relation with said member, said circuit including means that introduces a time delay to maintain said circuit inactive for a limited time upon movement of the stock out of cooperation with said member, said time delay being substantially greater than the interval required to perform a complete cycle of operation.

4. In an indicating system for machines operating on metallic stock fed to the machine in successive increments, an indicating circuit, a member against which the stock is urged to make an electric contact therewith, said stock being so urged for a limited portion of each complete cycle of operation from the feeding of one increment to the feeding of a successive increment, and means associated with said member for rendering said circuit inactive while said stock is in contact with said member, said circuit including means that introduces a time delay to maintain said circuit inactive for a limited time upon movement of the stock out of contact with said member, said time delay being substantially greater than the interval required to perform a complete cycle of operation.

5. In a system for registering the number of cycles of operation of a machine on metallic stock adapted to be fed to the machine in increments, as well as for indicating when the supply of stock thus being fed is exhausted: a circuit including a counter, a metallic member with which the stock contacts during one portion only of the cycle of operation of the machine, said counter circuit being controlled to perform a counting operation upon establishing of said contact, and an indicating circuit including an indicator for indicating when the supply of stock is exhausted, said counter circuit including a circuit controller actuated in response to the energization of the counter circuit, for maintaining said indicator ineffective.

6. In a system for registering the number of cycles of operation of a machine on metallic stock adapted to be fed to the machine in increments, as well as for indicating when the supply of stock thus being fed is exhausted: a circuit including a counter, a metallic member with which the stock contacts during one portion only of the cycle of operation of the machine, said counter circuit being controlled to perform a counting operation upon establishing of said contact, and an indicating circuit including an indicator for indicating when the supply of stock is exhausted, said counter circuit including a time delay means actuated in response to the conclusion of the period of contact between the stock and the member, and causing said indicator circuit to remain inactive for a period substantially greater than the interval required to perform a complete cycle of operations on the stock.

7. In a system for registering the number of cycles of operation of a machine on metallic stock adapted to be fed to the machine in increments, as well as for indicating when the supply of stock thus being fed is exhausted: a circuit including a counter, a metallic member with which the stock contacts during one portion only of the cycle of operation of the machine, said counter circuit being controlled to perform a counting operation upon establishing of said contact, and an indicating circuit including an indicator for indicating when the supply of stock is exhausted, said counter circuit including a circuit controlling means maintaining said indicator circuit ineffective to indicate that the stock is exhausted said means being rendered effective in response to the conclusion of the period of contact between the stock and the member, said counter circuit also including means for maintaining the counter circuit in active controlling condition for a limited time upon removal of the stock from the member, said time delay being substantially less than the interval required to perform a complete cycle of operations on the stock.

8. In a registering system for machines operating upon stock fed to the machine, a register, an electric circuit for operating the register, and a switching means for said circuit and actuated upon placing the stock in operative position in the the machine, said switching means being held in controlling position by the stock for a portion only of the complete cycle of operation of the machine on the stock, said circuit including means that introduces a time delay to maintain the circuit in active controlling condition for a limited time and operative in response to return of the switching means to inactive position, said time delay being substantially less than the interval required to perform a complete cycle of operations on the stock.

9. In a system for registering the number of cycles of operation of a machine on stock adapted to be fed to the machine in increments, as well as for indicating when the supply of stock thus being fed is exhausted: a circuit including a counter, switching means actuated to a controlling position by the stock during one portion only of the cycle of operation of the machine, said counter circuit being controlled by said switching means to perform a counting operation for each switching cycle, and an indicating circuit including an indicator for indicating when the supply of stock is exhausted, said counter circuit including a circuit controlling means operating while the counter circuit is active, to cause said indicator circuit to remain ineffective.

10. In a system for registering the number of cycles of operation of a machine on stock adapted to be fed to the machine in increments, as well as for indicating when the supply of stock thus being fed is exhausted: a circuit including a counter, switching means actuated to a controlling position by the stock during one portion only of the cycle of operation of the machine, said counter circuit being controlled by said switching means to perform a counting operation for each switching cycle, and an indicating circuit including an indicator for indicating when the supply of stock is exhausted, said counter circuit including a time delay means actuated in response to the return of the switching means to inactive position and causing said indicator circuit to remain inactive for a period substantially greater than the interval required to perform a complete cycle of operations on the stock.

11. In a system for registering the number of cycles of operation of a machine on stock adapted to be fed to the machine in increments, as well as for indicating when the supply of stock thus being fed is exhausted: a circuit including a counter, switching means actuated to a controlling position by the stock during one portion only of the cycle of operation of the machine, said counter circuit being controlled by said switching means to perform a counting operation for each switching cycle, and an indicating circuit including an indicator for indicating when the supply of stock is exhausted, said counter circuit including means operating while the counter circuit is active, for causing said indicator circuit to remain ineffective, said counter circuit also including means for maintaining the counter circuit in active controlling condition for a limited time upon return of the switching means to inactive position, said time delay being substantially less than the interval required to perform a complete cycle of operations on the stock.

WILLIAM A. RAY.

REFERENCES CITED

The following references are of record in the file of this patent:

UNITED STATES PATENTS

| Number | Name | Date |
|---|---|---|
| 2,269,501 | Wiley | Jan. 13, 1942 |
| 2,337,132 | Shaw | Dec. 21, 1943 |
| 1,607,182 | Baker | Nov. 16, 1926 |
| 2,318,372 | Caldwell | May 4, 1943 |
| 2,048,192 | Marston | July 21, 1936 |
| 2,098,872 | Kriggner | Nov. 9, 1937 |
| 2,267,986 | MacKavanaugh | Dec. 30, 1941 |
| 1,040,378 | Miller | Oct. 8, 1912 |
| 1,338,761 | Wetmore | Nov. 16, 1926 |
| 2,068,293 | Ilgenfritz | Jan. 19, 1937 |
| 1,552,321 | Lea | Sept. 1, 1925 |
| 1,909,471 | Kelly, Jr. | May 16, 1933 |